United States Patent [19]

Kent

[11] 4,111,619
[45] Sep. 5, 1978

[54] APPARATUS FOR PREPARING TREAD BANDS FOR USE IN TIRE RETREADING

[75] Inventor: Jan Herbert Farquharson Kent, St. Martin, Jersey, Channel Islands

[73] Assignee: Beverly Limited, England

[21] Appl. No.: 789,621

[22] Filed: Apr. 21, 1977

[30] Foreign Application Priority Data

Apr. 23, 1976 [GB] United Kingdom ............ 789621/76

[51] Int. Cl.² .......................................... B29H 5/02
[52] U.S. Cl. .................................................. 425/43
[58] Field of Search ...................... 425/28 D, 43, 35

[56] References Cited

U.S. PATENT DOCUMENTS

| 3,775,528 | 11/1973 | Benege | 425/43 X |
| 3,871,941 | 3/1975 | Wasko | 425/43 X |

Primary Examiner—J. Howard Flint, Jr.

[57] ABSTRACT

A sinker unit for preparing an annular unvulcanized trend band comprises an annular mold for supporting the tread band and an expandable annular sinker member for forcing the tread band against the inner surface of the mold. The sinker member includes side walls which are resiliently biassed outwardly so that the sinker member is maintained in a tensioned condition when it is forced against the tread band. The sinker member may be forced against the tread band by means of an expanding air bag underneath the sinker member.

12 Claims, 4 Drawing Figures

APPARATUS FOR PREPARING TREAD BANDS FOR USE IN TIRE RETREADING

This invention relates to the manufacture of tread bands for use in the retreading of tires.

In the past, retreading of tires has commonly been carried out by building up a prepared worn carcass with unvulcanised rubber compound and applying heat and pressure both to vulcanise the tread material and simultaneously to make the bond between it and the tire. In recent years, however, it has become the practice to manufacture a prevulcanised tread band on one side of which is formed the desired tread pattern, while the reverse side is for applicaton of the bonding material.

It has been found advantageous to form the tread band as an annular band so that, in cross section, both the upper surface and the under surface are arcuate, the radius of curvature of the tread band cross section being made approximately equal to that of the tire to which it is to be attached.

It is not generally feasible to buff a worn tire down to a substantially flat bonding surface, while it is much simpler to arrange for the tire to be buffed to a certain cross sectional radius. Clearly, if the tread is moulded as an endless ring with an internal radius to match that of the buffed tire, bonding of the tread band to the tire will be possible without uneven stressing over the bonding surface.

Our British Pat. No. 973,764 describes a method of forming an annular tread band for bonding to a buffed tire carcass by using a sinker member to press an unvulcanised annular tread band into a mould, the sinker member comprising a conventional smooth surfaced tire casing whose beads are spread apart so that the casing can be inserted into the mould. The mould cavity is constructed so as to be an exact fit with the sinker member, which means that the sinker member can only be used in combination with a mould having a mould cavity width substantially the same as that of the sinker member. It is therefore, not possible to produce tread bands of different widths using a single member as described in the above numbered patent.

By means of the present invention, it is possible to provide a sinker unit which can manufacture unvulcanised tread bands of varying widths using the same sinker member for each width of tread band.

According to the invention there is provided a sinker unit for preparing an annular unvulcanised tread band from a strip of unvulcanised tread material, comprising an annular mould for supporting the strip of tread material on the inner surface of the mould, an expandable annular sinker member located radially inwardly of the mould, and means for forcing the sinker member against the strip of tread material in the mould, the sinker member comprising a ring of resilient material which is capable of uniform circumferential expansion and contraction over its whole length, the ring including an annular central zone for contacting the strip of tread material and a side wall extending outwardly from each side of the central zone, each side wall being resiliently biassed outwardly so as to maintain the sinker member in a tensioned condition during its movement towards the strip of tread material.

Preferably the sinker member is a buffed cross ply tire carcass without its bead wires, the carcass being composed of many thousands of fabric cords each insulated from its neighbour by a film of a polymer material, and with each ply lying at an angle to the next one. This permits the sinker member to expand and contract circumferentially with complete uniformity over its whole length, and thus cause no interference with the distribution of the tread material. At the same time the backing of one ply on another causes the face of the sinker unit to be sufficiently hard to overcome the natural tendency for the tread pattern of the mould to be reflected through the tread band and to be retained on the inner face of the band.

The use of the cross ply tire for sinking the tread band into the mould is equivalent to using fluid pressure to apply pressure equally and instantaneously over the whole of the tread strip, and this makes the method of forming an unvulcanised tread by using the sinker unit of the invention quicker in operation and the apparatus cheaper in cost than a mechanical arrangement of external and internal segments.

The sinker member may also be built from calendered cord material with each ply biassed at the required angle. Preferably, the plies of the calendered cord material, and those of the cross ply carcass, are inclined at angles between 10° and 50° to the mid-circumferential plane of the tire. The particularly preferred angle is 45°. Preferably, the side walls of the sinker member are cut to a zig-zag pattern, each outwardly pointing portion of which is attached to a spring which is firmly fixed at its other end to a support member. The means for forcing the sinker member against the strip of tread material may advantageously comprise a gas bag of the type described in our British Pat. No. 963,953, which is located under the inner surface of the sinker member, and which is pressurised with a gas, preferably air, in order to bear against the sinker member.

The annular mould may be designed so that the tread band exactly fits the mould inner surface, without the side walls of the mould extending beyond the inner face of the tread band. In this way, when the sinker member is fully pressed against the tread band, the side walls of the sinker member are free of the side walls of the mould.

The unvulcanised tread band produced by the sinker unit of the invention may be placed into a vulcanising mould, so that complete vulcanisation can take place. A suitable type of mould for this purpose comprises an outer mould element, an inner expandable ring forming, together with the mould element, a mould cavity for the tread band, and means for rapidly supplying high pressure to the tread band by causing the inner ring to expand radially outwardly, thereby forcing the inner ring against the tread band.

The invention is now described, by way of example, with reference to the accompanying drawings, wherein.

Figure 1:
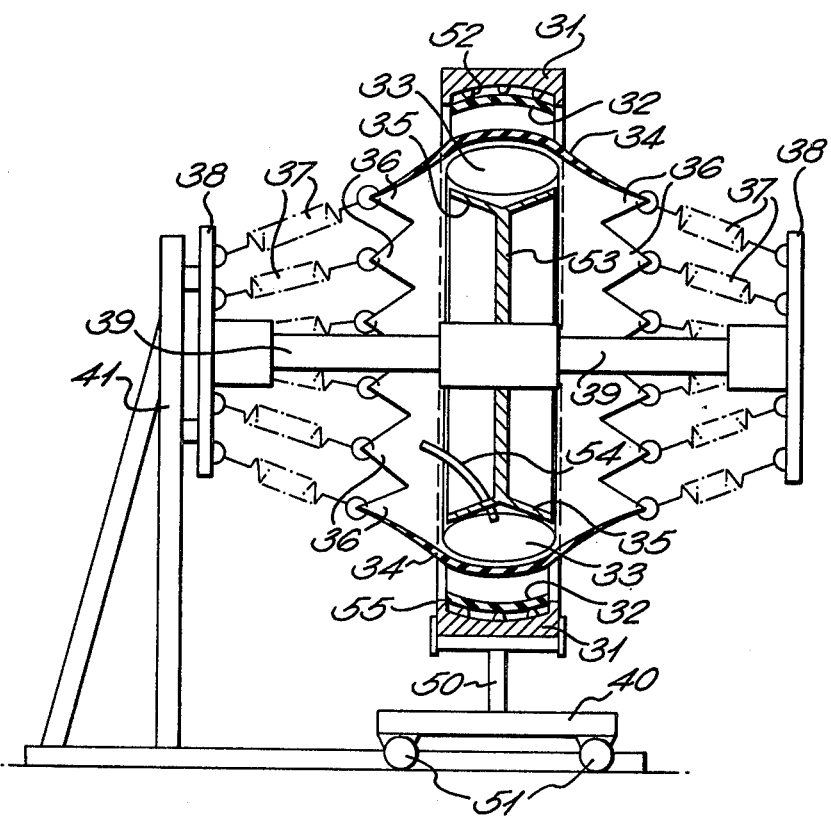
FIG. 1 is a side elevation, partly, in section of a sinker unit according to the invention.

Referring to FIG. 1 of the drawings, an annular mould 31 is mounted on several vertical columns 50 (only one is shown) which are secured to a carriage 40, the latter being provided with wheels 51 so that the mould 31 can be moved in a horizontal plane. The mould 31 is loaded with a strip of unvulcanised tread material 32 which is retained in position resting on the tread pattern 52 on the inner face of the mould 31.

Figure 3:
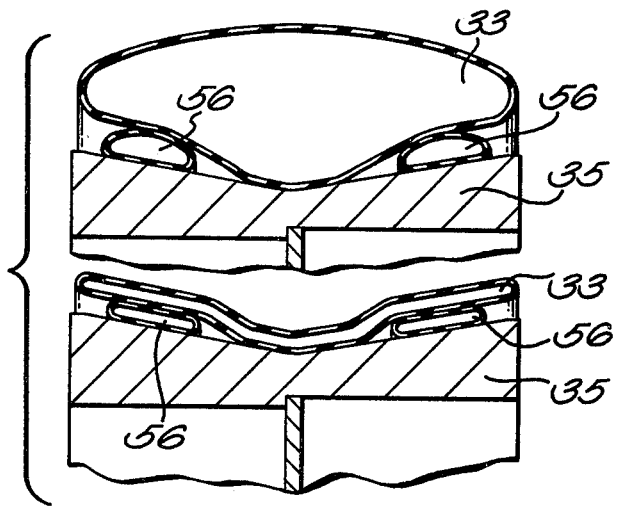
FIG. 3 is an enlarged view of part of FIG. 1 showing an alternative arrangement of air bags.

A cylindrical metal casting 53 is located radially inwardly of the mould 31 and lies in the same vertical plane as the mould, the horizontal axes of the casting 53 and the mould 31 being coincident. The circumferential periphery of the casting 53 is formed with a shallow V-shaped channel 35 on which is supported an annular air bag 33, and two smaller air bags 56 (see FIG. 3) may be sandwiched between the V-shaped channel 35 and the air bag 33.

A sinker member 34 overlies the air bag 33, the member comprising a cross ply tire carcass which has been buffed down on the outside surface and has had its bead wires removed. The removal of the bead wires enables the side walls of the member 34 to be spread apart much further than when the bead wires are present, and this in turn enables the buffed outer surface of the member 34 to take up different configurations according to the size of the mould cavity being employed.

To aid further the spreading apart of the side walls of the member 34 each of the side walls is cut to form a zig-zag pattern so that the wall terminates in a series of circumferentially spaced points 36, each point being attached to a spring 37 which is anchored at its other end to a fixed vertical plate 38, there being one plate 38 for each side wall and its corresponding array of springs.

One plate 38 carrying its arrangement of springs 37, is attached to a vertical support column 41 which is secured firmly to the ground. The one plate 38 also supports a horizontal arm 39 on which is mounted the casting 53 and, at the other end of the arm 39, the other plate 38. The casting 53 is located midway between the two plates.

To form an unvulcanised tread band from a strip of unvulcanised rubber, the mould 31 is first located accurately over the sinker member 34 by means of the carriage 40. At this stage in the process, the sinker member 34 is held spread apart under a relatively small tension from the springs 37, and the air bags 33 and 56, if fitted, in its or their fully collapsed condition.

Air under pressure is then introduced into the bags 33 and 56, if fitted, each bag tending to take up a circular cross section thereby pushing against the inner surface of the member 34 and causing it to move towards the mould 31. By using bags 56 in addition to bag 33, it is possible to vary the contour of the sinker member 34 by adjusting the relative pressures, and hence the relative degrees of inflation of the bags 56 and 33. The facility for varying the contour of sinker member 34 is particularly valuable because it means that the same sinker member 34 may be used satisfactorily with different sized moulds. The outward movement of the member 34 causes the tension in the springs 37 to increase, so that when the member 34 has fully pressed the tread strip against the patterned inner surface of the mould, the side walls of the member are held apart in a tensioned condition. By varying the tension in the springs and the amount of upward movement of the member 34 during inflation of the bags 33 and 56, if fitted, the transverse radius of curvature of the outer surface of the sinker member 34 can be varied to suit the size of the mould cavity. As mentioned above, this variation can be aided by adjusting the relative degrees of inflation of the bags 33 and 56. Hence, different widths of tread bands can be formed using the same sinker member, which greatly increases the efficiency and versatility of the moulding process.

The construction of the mould 31 itself assists in the process, since the side flanges 55 of the mould are designed so that they do not extend beyond the thickness of the tread. Thus, when the member 34 is pressed fully against the tread material 32 there is little or no extension of the flanges 55 beyond the side edges of the tread material 32 and the member 34 can take up the desired configuration so as to press evenly against the tread. This construction permits an unvulcanised tread band to be made with great accuracy.

It should be appreciated that the zig-zag pattern cut into the side walls of the member 34 is only one example of the possible ways of adapting the side walls so they can be spread apart in an easily controlled manner and, so long as the bead wires have been removed from the member 34, other patterns may be cut to give the member 34 the required degree of flexibility.

Having formed the unvulcanised tread band in the manner described above, the mould 31 is removed from the sinker member 34 and its associated support structure by rolling away the carriage 40. The mould 31 may alternatively be suspended from a carriage which can be moved along an overhead track (not shown). The next stage of producing a vulcanised tread band is then carried out in the apparatus shown in FIG. 2 of the drawings.

Figure 2:
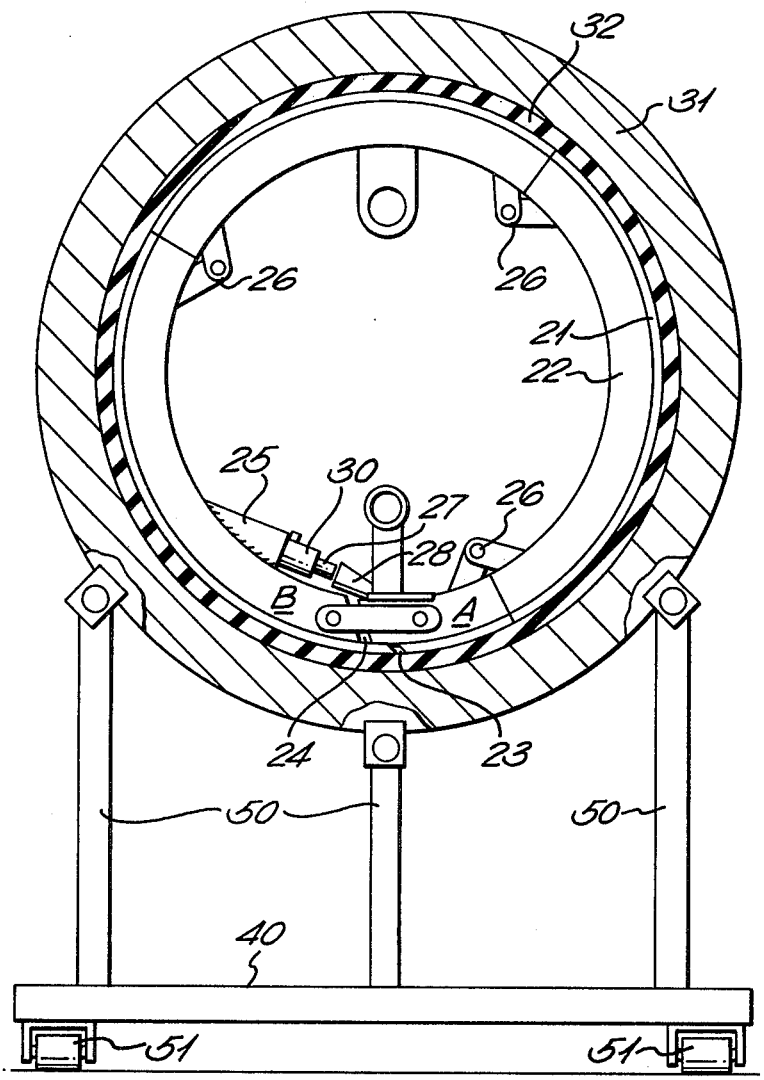
FIG. 2 is a side elevation of a mould, partly in section, for forming a vulcanised tread band from the unvulcanised band produced by the sinker unit of FIG. 1.

Referring to FIG. 2 of the drawings, there is shown an annular mould 31, which is the same as that shown in FIG. 1 of the drawings, carrying the unvulcanised tread band 32 having the desired tread pattern impressed thereon.

The mould 31 is positioned over a mould sub-assembly comprising two inner, expansible rings 21 and 22, each of which is in a segmented form, the segments being connected by hinged linkages 26 to enable the rings to expand and contract easily.

The outer surface of ring 21 is arcuate in cross section and the inner surface may have any desired cross section. The outer surface of ring 22 is configured to mate with the inner surface of ring 21. Preferably, the inner and outer surfaces of ring 21 are both arcuate in cross section and, in use, the outer surface bears against the inner surface of the tread band 32. Ring 22 preferably has a convex outer surface which supports ring 21 at the inner concave surface of the latter.

In order to compress the tread band 32 within the mould cavity defined by the inner surface of the mould 31 and the outer surface of the ring 21, rings 21 and 22 are expanded outwardly a very small amount by means of a hydraulic ram and cylinder assembly. The assembly consists of a hydraulic cylinder 30 in which is mounted a ram 27 which can act against a block 28 attached to a segment A of the ring 22, hydraulic pressure being supplied to the cylinder 30 through tubing 29. The rear of the cylinder 30 is fixed to a stepped protrusion 25 on a further segment B of the ring 22. When high pressure, for example, about 1 ton per square inch, is applied to the cylinder 30, the two segments A and B tend to move in opposite directions, thereby forcing the ring 22 outwardly. This in turn causes the ring 21 to bear against the tread band 32. By maintaining the pressure against the tread band 32, and simultaneously applying a vulcanising temperature to the mould 31, the tread band may quickly and easily be vulcanised.

By using the sinker unit according to the invention, the mould 31 can be accurately filled with tread material, so the additional movement of the rings 21 and 22 need only be very small to exert the desired pressure on the tread material. This small movement in turn means that very little tread material will escape through gap 23 in the ring 21 when the ring expands and the gap increases in size. Since the gap 24 in ring 22 is not in registry with gap 23, no material will escape through gap 24.

Figure 4:
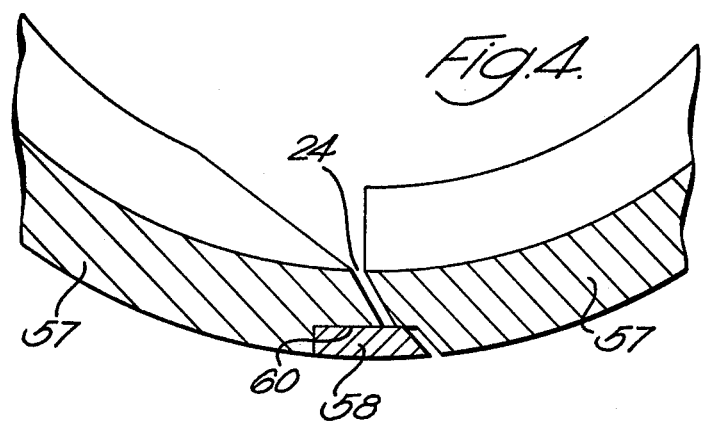
FIG. 4 is an enlarged sectional view of part of FIG. 2, showing an alternative arrangement of a mould ring.

Instead of utilising the two rings 21 and 22, it is possible to employ one segmented ring 57 (see FIG. 4) having a recess 60 machined into its outer face, into which recess is fitted a segment 58 having an outer curvature the same as that of the ring 57. Segment 58 checks the flow of material through gap 24 when segments A and B are moved apart by the ram and cylinder assembly.

I claim:

1. A sinker unit for preparing an annular unvulcanised tread band from a strip of unvulcanised tread material, comprising
    (a) an annular mould for supporting the strip of tread material on the inner surface of the mould
    (b) an expandable annular sinker member located inwardly of the mould for forcing the strip of tread material against the inner surface of the mould, the sinker member comprising a ring of resilient material which is capable of uniform circumferential expansion and contraction over its whole length, the ring including an annular central zone for contacting the strip of tread material and a side wall extending outwardly from each side of the central zone with each side wall being resiliently biassed outwardly, and
    (c) means located radially inwardly of the sinker member for forcing the sinker member against the strip of tread material, the sinker member being maintained in a tensioned condition, by means of the resilient bias, during its movement against the strip.

2. A sinker unit according to claim 1 wherein the sinker member comprises a buffed cross ply tire carcass without its bead wires, or calendered cord material.

3. A sinker unit according to claim 2 wherein the plies of the tire carcass or cord material are inclined at 45° to the mid-circumferential plane of the sinker member.

4. A sinker unit according to claim 1 wherein the plurality of circumferentially spaced springs is attached to each side wall at one end of each spring, the other end of each spring being fixed to a support structure.

5. A sinker unit according to claim 4 wherein each side wall is cut to a zig-zag pattern, each outwardly pointing portion of the pattern being attached to a spring.

6. A sinker unit according to claim 1 wherein the means for forcing the sinker member against the strip of tread material comprises an annular gas bag located under the inner surface of the sinker member, which bag is pressurised with a gas in order to bear against the sinker member.

7. A sinker unit according to claim 6 wherein a V-shaped annular channel is located radially inwardly of the sinker member and supports the gas bag thereon.

8. A sinker unit according to claim 7 wherein at least two additional annular gas bags, each having a transverse cross section significantly less than that of the first gas bag, are sandwiched between the first gas bag and the V-shaped channel.

9. A sinker unit according to claim 2 wherein a plurality of circumferentially spaced springs is attached to each side wall at one end of each spring, the other end of each spring being fixed to a support structure.

10. A sinker unit according to claim 9 wherein each side wall is cut to a zig-zag pattern, each outwardly pointing portion of the pattern being attached to a spring.

11. A sinker unit according to claim 9 wherein the means for forcing the sinker member against the strip of tread material comprises an annular bag located under the inner surface of the sinker member, which bag is pressurised with a gas in order to bear against the sinker member.

12. A sinker unit according to claim 1 wherein the annular mould is mounted for movement in a horizontal plane, independently of the sinker member.

* * * * *

UNITED STATES PATENT OFFICE
CERTIFICATE OF CORRECTION

PATENT NO. : 4,111,619
DATED : September 5, 1978
INVENTOR(S) : Jan Herbert Kent

It is certified that error appears in the above-identified patent and that said Letters Patent are hereby corrected as shown below:

---[73] Assignee: BEVERLEY LIMITED of Longueville, St. Saviour, Jersey, British Channel Islands.---

Signed and Sealed this

Tenth Day of July 1979

[SEAL]

Attest:

LUTRELLE F. PARKER

*Attesting Officer*  *Acting Commissioner of Patents and Trademarks*